United States Patent [19]

Bilak

[11] Patent Number: 4,672,993

[45] Date of Patent: Jun. 16, 1987

[54] PLUG

[75] Inventor: Vasil Bilak, Eschau, France

[73] Assignee: General Motors Corporation, Detroit, Mich.

[21] Appl. No.: 800,491

[22] Filed: Nov. 21, 1985

[30] Foreign Application Priority Data

Nov. 23, 1984 [GB] United Kingdom ............... 8429634

[51] Int. Cl.4 ............................................. F16K 13/00
[52] U.S. Cl. ................................ 137/322; 251/149.8;
251/339; 251/149.4; 222/501
[58] Field of Search ............... 137/317, 319, 320, 322;
141/349, 291; 222/501, 525; 251/149.4, 149.8,
318, 319, 339, 347; 285/158, 334.5, 393

[56] References Cited

U.S. PATENT DOCUMENTS

| 341,339 | 5/1886 | Linindoll | 251/149.4 |
|---|---|---|---|
| 404,918 | 6/1889 | Linindoll | 251/149.4 |
| 409,059 | 8/1889 | Northup | 251/149.4 |
| 2,172,311 | 9/1939 | Thomas | 137/322 |
| 2,283,970 | 5/1942 | Buttner | 137/322 |
| 2,881,011 | 4/1959 | Coughlin | 251/149.4 |
| 2,989,091 | 6/1961 | Lowenthal | 141/349 |
| 3,339,883 | 9/1967 | Drake | 251/149.4 |
| 4,193,419 | 3/1980 | Pellerito | 137/332 |

Primary Examiner—A. Michael Chambers
Assistant Examiner—John C. Fox
Attorney, Agent, or Firm—D. D. McGraw

[57] ABSTRACT

A plug for closing an opening in a container also allows connection of a pipe to the container without removal of the plug, thereby substantially reducing the risk of leakage of fluid from the container.

4 Claims, 7 Drawing Figures

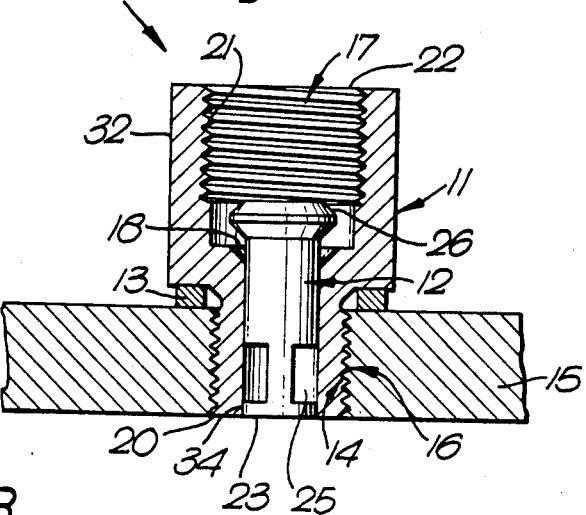
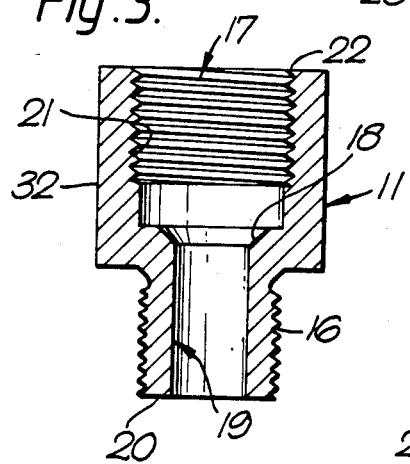
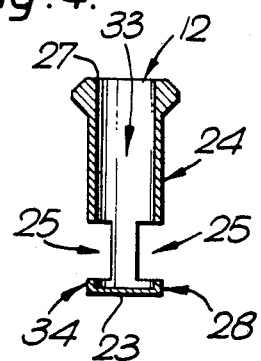
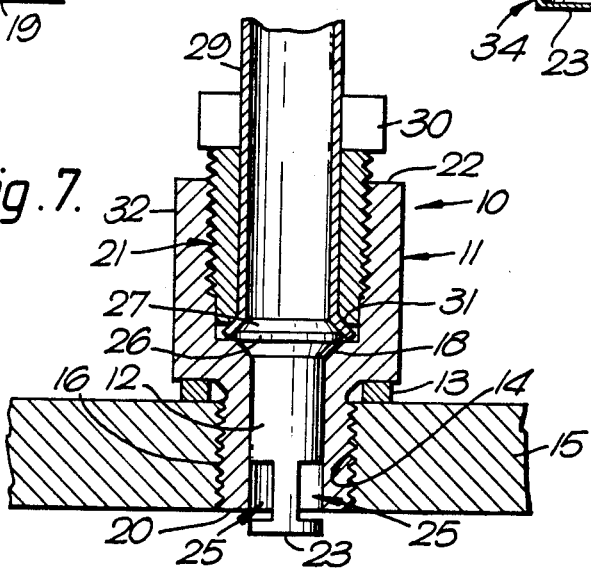

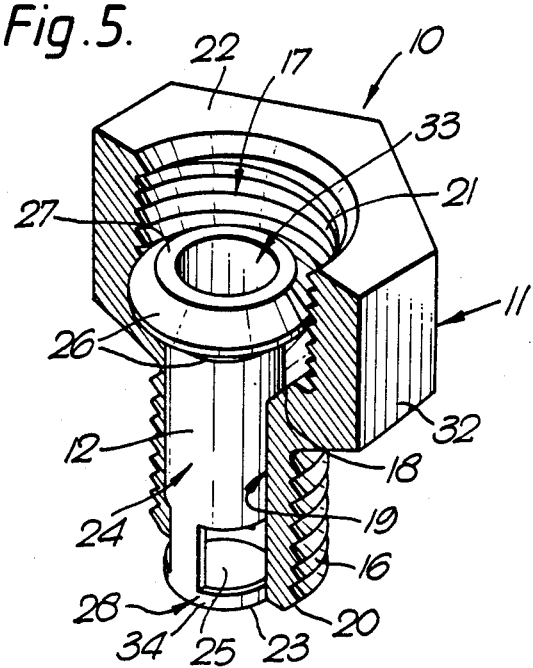
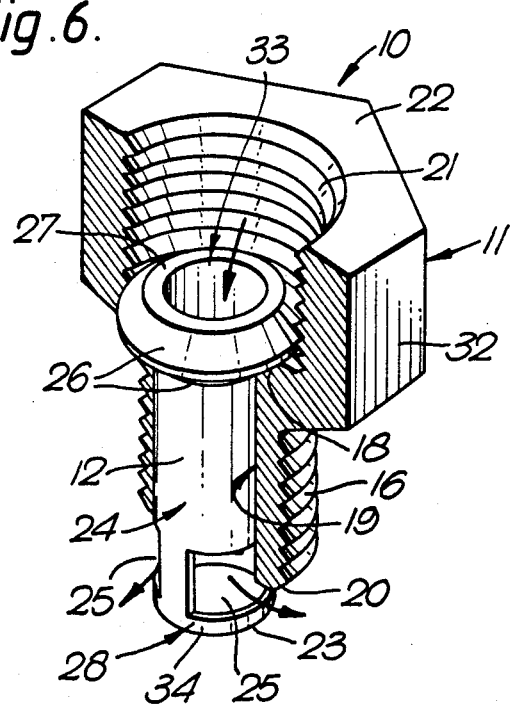

1

PLUG

This invention relates to a plug for closing an opening in a container and for allowing connection of a pipe to the container.

It is known to provide a container with a threaded opening to which a pipe can be connected using a nut attached to the pipe. If a fluid (either gas or liquid) is stored in the container prior to the connection of the pipe, the threaded opening is usually closed by a threaded plastic sealing plug. In order to connect the pipe to the container the sealing plug has to be removed, a threaded socket is screwed into the opening, and the nut on the pipe is screwed to the threaded socket, thereby providing a sealed connection between the pipe and the container. This known arrangement has the disadvantage that fluid may escape from the container between removal of the sealing plug and connection of the pipe.

According to the present invention a plug for closing an opening in a container and for allowing connection of a pipe to the container comprises a socket member and a tubular member, the socket member having a first threaded surface for engaging a corresponding threaded surface on the container opening; a head for engagement for screwing the plug to the container; a longitudinally extending through-aperture having a smooth inner surface extending along at least part of its length from the end of the socket member to be attached to the container opening; and a second threaded surface for engagement with the threaded surface of a nut attached to the pipe; the tubular member being positioned in the through-aperture in the socket member, and having a closed end; a smooth outer surface along at least part of its length substantially corresponding in shape and diameter to the smooth inner surface of the through-aperture of the socket member; at least one aperture in the smooth outer surface adjacent the closed end communicating with the hollow interior of the tubular member; and a shaped head portion at the end remote from the closed end for engagement by the pipe as the nut is screwed to the socket member for moving the tubular member relative to the socket member from a first (closed) position in which the closed end of the tubular member is substantially flush with the end of the socket member to be positioned within the container opening to a second (open) position in which the at least one aperture in the tubular member is outside the through-aperture of the socket member.

When the tubular member is in its first position it closes the through-aperture in the socket member. When the tubular member is moved to its second position by connection of a pipe the through-aperture is opened thereby providing a passageway between the pipe and the container. A plug in accordance with the present invention therefore acts as a means for closing an opening in a container and as means for connecting a pipe to the container. As the plug does not have to be removed in order to connect the pipe, the risk of escape of fluid is substantially reduced.

The through-aperture preferably has a lip portion and the smooth inner surface extends from the end of the socket member to be attached to the container opening to the lip portion, and the shaped head portion of the tubular member engages the lip portion when the tubular member is in its second position to form a seal between the socket member and the pipe.

Preferably the head of the socket member is of hexagonal shape.

The first threaded surface on the socket member is preferably on an outer surface of the socket member. The second threaded surface on the socket member is preferably on the surface of the through-aperture and is positioned between the smooth inner surface and the end of the socket member remote from the container.

Preferably the tubular member has a sealant coating on its smooth outer surface adjacent the closed end to ensure a seal is formed between the tubular member and the socket member when the tubular member is in its first position.

The plug preferably also comprises a sealing ring for forming a seal between the socket member and the container.

This invention is now described, by way of example, with reference to the accompanying drawings in which:

FIG. 2 is a cross sectional view of a plug in accordance with the invention closing an opening in a container.

FIG. 3 is a cross-sectional view of the socket member of the plug shown in FIG. 2.

FIG. 4 is a cross-sectional view of the tubular member of the plug shown in FIG. 2.

FIGS. 5 and 6 are pictorial cross-sectional views of the plug in FIG. 2 with the tubular member in its first (closed) and second (open) positions respectively.

FIG. 7 is a cross-sectional view of the plug shown in FIG. 2 shown connecting a pipe to a container.

Figure 1:
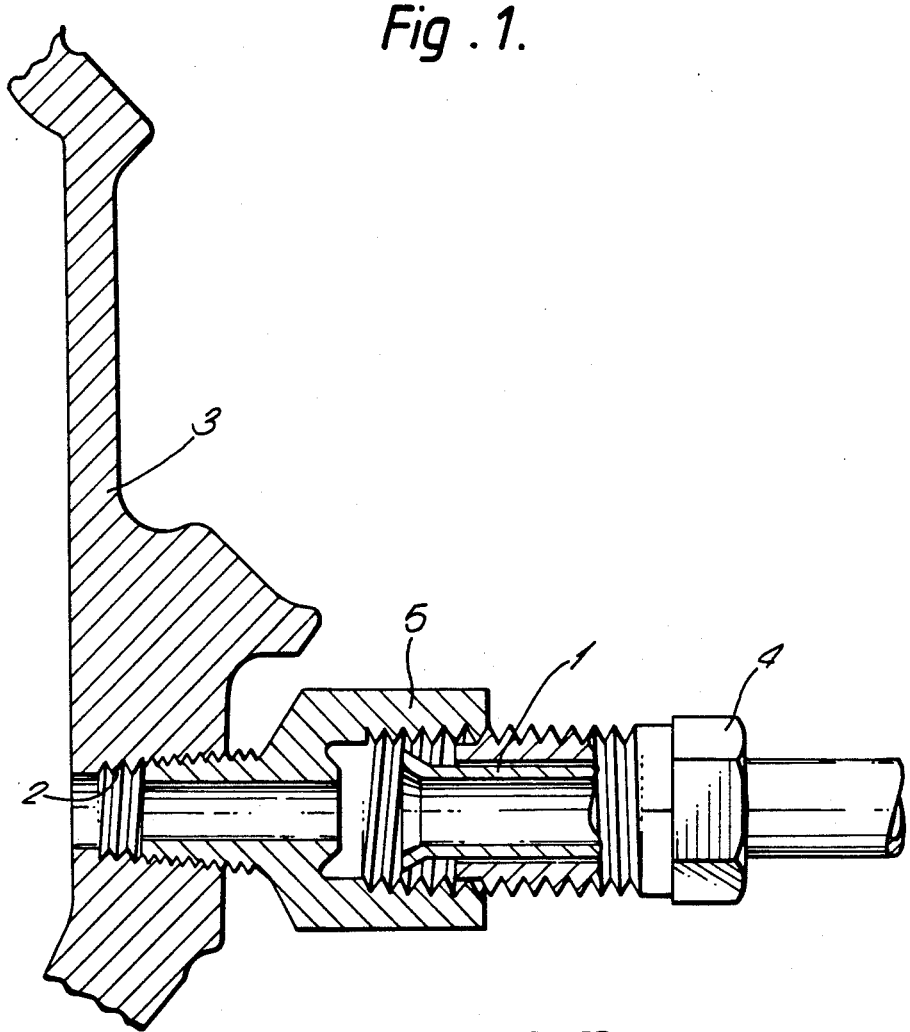
FIG. 1 is a cross-sectional view of the known arrangement for connecting a pipe to a container.

Referring to FIG. 1, in the arrangement shown a pipe 1 is connected to a threaded opening 2 in a container 3 using a nut 4 attached to the pipe and a threaded socket 5. The arrangement is shown with the threaded socket 5 and nut 4 only partially fastened.

Referring to FIG. 2, the plug 10 in accordance with the invention comprises a socket member 11, a tubular member 12 and a sealing ring 13. The plug 10 is shown screwed into the threaded opening 14 of a container 15 with the tubular member 12 placed in a first position to sealingly close the opening.

The socket member 11 (shown more clearly in FIG. 3) comprises a first threaded surface 16 for engaging the threaded opening 14 of container 15, a longitudinally extending through-aperture 17, and a hexagonal head 32. The through-aperture 17 has a lip portion 18 having a frustoconical shape, a smooth inner surface 19 extending from the lip portion to a first end 20 of the socket member 11 which is attached to the opening 14, and a second threaded surface 21 extending from the lip portion to the (other) end 22 of the socket member which is remote from the container 15.

The tubular member 12 (as shown more clearly in FIG. 4) has a closed end 23, a smooth outer surface 24 which substantially corresponds in shape and diameter to the smooth inner surface 19 of the through-aperture 17 of the socket member 11, two apertures 25 in the smooth outer surface 24 adjacent the closed end 23 and which communicate with the hollow interior 33 of the tubular member, and a head portion 26 which is frustoconically shaped at the end 27 remote from the closed end. The outer surface 34 of the tubular member 12 adjacent the closed end 23 is covered with a sealant coating 28 (for example, a curable sealant commercially available under the trade name LOCTITE) to enhance the seal between the tubular member 12 and the socket member 11 when the tubular member is in its first position, but allow sliding of the tubular member from its first position to its second position (described below). Alternatively, the outer surface 34 may form an interference fit with the inner surface 19 of the through-aperture 17 of the socket member.

The socket member 11 and tubular member are preferably of steel with a zinc plate, and the sealing ring 13 is preferably of copper. It will be appreciated that any other suitable materials may be used.

The plug 10 is screwed into the opening 14 in the container 15 by using a suitable tool (not shown) engaging the hexagonal head 32.

With the tubular member 12 in its first position (see FIGS. 2 and 5) the closed end 23 is substantially flush with the first end 20 of socket member 11 and the plug 10 closes the opening 14 in the container 15. In order to attach a pipe 29 (See FIG. 7) to the opening 14, a nut 30 attached to the pipe is simply screwed to the second threaded surface 21 on the socket member 11. This forces the end 31 of the pipe 29 to engage the head portion 26 of the tubular member 12, thereby moving the tubular member to a second position as shown in FIGS. 6 and 7. In the second position the apertures 25 in the tubular member 12 are outside the through-aperture 17 in the socket member 11, and a passageway is therefore provided (as shown by the arrows in FIG. 6) through the plug 10 between the pipe 29 and the container 15. Also, the head portion 26 of the tubular member 12 engages the lip portion 18 of the through-aperture 17 of the socket member 11, and the end 31 of the pipe 29 engages the head portion 26 to provide a seal between the pipe and the socket member.

A plug in accordance with the present invention has particular application for closing threaded openings in transmission housings (containing oil) of motor vehicles, to which connecting pipes have to be fitted after assembly.

The embodiments of the invention in which an exclusive property or privilege is claimed are defined as follows:

1. A plug for closing an opening in a container and for allowing connection of a pipe to the interior of the container, said plug comprising:
a socket member and a tubular member;
said socket member having
one end provided with first fastening means for securing said socket member to the container opening, and an opposite end;
a longitudinally extending through-aperture having a frusto-conical lip portion and a smooth inner first surface extending along at least part of its length from said socket member one end to said frusto-conical lip portion;
and a second surface including a threaded surface on the opposite side of said frusto-conical lip portion from said first surface and extending to said socket member opposite end for engagement with the threaded surface of a nut attached to the pipe to be connected to the container;
said tubular member having a hollow interior, said tubular member being positioned in said socket member through-aperture and having:
a closed end and an open end remote from said closed end;
a smooth outer side surface along at least part of its length including said closed end, said smooth outer side surface substantially corresponding in shape and diameter to said socket member through-aperture smooth inner surface;
at least one aperture in said smooth outer side surface adjacent said closed end, said at least one aperture communicating with the hollow interior of said tubular member;
and a frusto-conically shaped head portion at said open end adapted for sealing and force-transmitting engagement by the pipe as the nut is screwed to said socket member
for moving said tubular member relative to said socket member
from a first position in which said tubular member head portion one frusto-conical surface is axially spaced from said socket member frusto-conical lip portion and said tubular member at least one aperture is closed by a portion of said socket member through-aperture smooth inner surface
to a second position in which said tubular member head portion one frusto-conical surface is sealingly mated with said socket member frusto-conical lip portion, the pipe is sealingly engaged with said head portion other frusto-conical surface, and said tubular member at least one aperture is positioned outside said socket member through-aperture and thus establishes a passageway between the pipe and the container through the hollow interior of said tubular member.

2. The plug of claim 1 wherein said tubular member has a sealant coating on said smooth outer side surface at least between said at least one aperture and said closed end, said sealant coating cooperating with said tubular member and said socket member to prevent fluid leakage between radially adjacent parts of said tubular member smooth outer side surface and said socket member smooth inner first surface between which said sealant coating is located.

3. The plug of claim 2 in which said sealant coating which is between said at least one aperture and said closed end seals between said tubular member smooth outer side surface and said socket member smooth inner surface so long as said tubular member is in said first position.

4. A plug assembly selectively closing an opening in a container and connecting a pipe into fluid communication with the interior of the container, said assembly comprising:
a socket member, a tubular member, a pipe having a flared end, and a nut on said pipe having a threaded surface;
said socket member having
one end provided with first fastening means and sealing means for securing and sealing said socket member to the container opening, and an opposite end;
a longitudinally extending through-aperture having a frusto-conical lip portion and a cylindrical smooth inner first surface extending along at least part of the length of said through-aperture from said socket member one end to said frusto-conical lip portion;
and a second surface including a threaded surface on the opposite side of said frusto-conical lip portion from said first surface and extending to said socket member opposite end in threaded engagement with said nut threaded surface;
said tubular member having a hollow interior, said tubular member being positioned in said socket member through-aperture for axial movement therein from a first position to a second position and having:

a closed end and an open end remote from said closed end;

a cylindrical smooth outer side surface along at least part of the length of said tubular member including said closed end, said cylindrical smooth outer side surface substantially corresponding in shape and diameter to said socket member through-aperture cylindrical smooth inner surface;

at least one aperture in said smooth outer side surface adjacent said closed end, said at least one aperture being in continuous fluid communication with the hollow interior of said tubular member;

and a frusto-conically shaped head portion at said open end placed in sealing and force-transmitting engagement with said pipe flared end, as said nut is threaded into said socket member to move said tubular member relative to said socket member from said first position in which said tubular member head portion one frusto-conical surface is axially spaced from said socket member frusto-conical lip portion and said tubular member at least one aperture is closed by a portion of said socket member through-aperture smooth inner surface to said second position in which said tubular member head portion one frusto-conical surface is sealingly mated with said socket member frusto-conical lip portion, said pipe flared end is sealingly engaged with said head portion other frusto-conical surface, and said tubular member at least one aperture is positioned outside said socket member through-aperture, establishing a fluid communication passageway between said pipe and the interior of the container through the hollow interior of said tubular member and said at least one aperture.

* * * * *